United States Patent
Esser et al.

(10) Patent No.: US 8,650,068 B2
(45) Date of Patent: Feb. 11, 2014

(54) METHOD AND SYSTEM FOR DETERMINING SERVICES PRICING

(75) Inventors: David Esser, Redwood City, CA (US); Aaron Tavistock, Albany, CA (US); Matthew Ellinwood, Piedmont, CA (US); David Sturtz, Berkeley, CA (US)

(73) Assignee: RepairPal, Inc., Emeryville, CA (US)

( * ) Notice: Subject to any disclaimer, the term of this patent is extended or adjusted under 35 U.S.C. 154(b) by 362 days.

(21) Appl. No.: 12/483,163

(22) Filed: Jun. 11, 2009

(65) Prior Publication Data

US 2009/0313035 A1    Dec. 17, 2009

Related U.S. Application Data

(60) Provisional application No. 61/060,745, filed on Jun. 11, 2008.

(51) Int. Cl.
*G06F 17/00* (2006.01)
*G06Q 10/00* (2012.01)
*G06Q 30/06* (2012.01)
*G06Q 10/04* (2012.01)

(52) U.S. Cl.
CPC ............ *G06Q 10/20* (2013.01); *G06Q 30/0601* (2013.01); *G06Q 10/04* (2013.01)
USPC .......... 705/7.35; 705/1.1; 705/26.4; 705/400; 701/31.8

(58) Field of Classification Search
CPC ... G06Q 30/0601; G06Q 30/02; G06Q 10/10; G06Q 30/0283
USPC ............ 705/1.1, 26.4, 400, 26.1, 26.43, 7.35; 701/29, 31.5; 707/100
See application file for complete search history.

(56) References Cited

U.S. PATENT DOCUMENTS

| | | | |
|---|---|---|---|
| 6,446,053 B1 | 9/2002 | Elliott | |
| 6,807,469 B2 * | 10/2004 | Funkhouser et al. | ........ 701/31.8 |
| 6,925,368 B2 | 8/2005 | Funkhouser et al. | |
| 7,343,306 B1 | 3/2008 | Bates et al. | |
| 7,636,676 B1 | 12/2009 | Wolery et al. | |
| 7,921,041 B1 * | 4/2011 | Wolery et al. | ................ 705/26.4 |
| 8,131,417 B2 | 3/2012 | Picard | |
| 2002/0016655 A1 | 2/2002 | Joao | |
| 2002/0073012 A1 | 6/2002 | Lowell et al. | |

(Continued)

OTHER PUBLICATIONS

Cho, Sungjin and Rust, John, "Is Econometrics Useful for Private Policy Making? A Case Study of Replacement Policy at an Auto Rental Company", Jul. 24, 2007, 35 pages.*

(Continued)

*Primary Examiner* — John Hayes
*Assistant Examiner* — Freda A Nelson
(74) *Attorney, Agent, or Firm* — Haverstock & Owens LLP

(57) ABSTRACT

A method of determining services pricing, the method comprising: a server receiving vehicle identification information from a user via a network connection, wherein the vehicle identification information indicates a vehicle type; the server receiving service type information from the user via the network connection, wherein the service type information indicates a service type; the server determining an estimate range based on the vehicle identification information and the service type information, wherein the estimate range comprises a minimum value and maximum value for the indicated vehicle type and service type, and wherein determining the estimate range comprises determining a labor estimate and a parts estimate; and the server providing the estimate range to the user via the network connection.

46 Claims, 15 Drawing Sheets

(56) References Cited

U.S. PATENT DOCUMENTS

| | | | | |
|---|---|---|---|---|
| 2002/0193925 | A1* | 12/2002 | Funkhouser et al. | 701/33 |
| 2003/0050830 | A1* | 3/2003 | Troyer | 705/11 |
| 2004/0243423 | A1* | 12/2004 | Rix et al. | 705/1 |
| 2005/0192858 | A1* | 9/2005 | Mueller | 705/10 |
| 2006/0064393 | A1* | 3/2006 | Orr | 705/400 |
| 2006/0184383 | A1* | 8/2006 | Davis et al. | 705/1 |
| 2007/0016483 | A1* | 1/2007 | Chenn | 705/26 |
| 2007/0295800 | A1 | 12/2007 | Staats | |
| 2008/0046446 | A1* | 2/2008 | Sundararajan et al. | 707/100 |
| 2008/0109128 | A1* | 5/2008 | Littooy et al. | 701/29 |
| 2009/0254454 | A1* | 10/2009 | Gupta | 705/27 |

OTHER PUBLICATIONS

Zino, Ken; "Repair Charges Much Higher at New Car Dealerships", Mar. 17, 2009, TheDetroitBureau.com, 3 pages.*

Ransom, Kevin, "Where is the Best Place to Get Your Car Serviced?", Jul. 6, 2009, AOL Autos, 6 pages.*

"Foreign Nameplate Vehicle Repairs Cost an Average 37% More at New Car Dealerships Than Independent Repair Shops", Mar. 11, 2009; AAIA Vehicle Repair Cost Study, 1 page.*

Eldridge, Earle, "When Autos NeedRrepair, Where? Increased Complexity Fuels Dealer, Independent Competition", Aug. 29, 2001, USA Today, 4 pages.*

Torbjornsen, Tom, "Auto Repair: Should You Use a Dealer or Independent Shop?", May 28, 2008, Autos.aol.com, 4 pages.*

International Search Report dated Aug. 11, 2009, PCT Application No. PCT/US2009/047111, filed Jun. 11, 2009, Repairpal, Inc.

Hale, Richard, "Supplier Park Cost Estimating," Cranfield University, School of Applied Sciences, entire document, Jun. 2006.

Williamson, Duncan, "Cost Behaviour: Application of the Theory to Depreciation Calculations," entire document, Feb. 2001.

WHI Solutions; Distribution Management, eCatalog, eCommerce, & Business Intelligence, p. 1of 1, accessed Jan. 19, 2012, <http://www.whisolutions.com/>.

Epicor Software Corporation (formerly Activant), p. 1 of 1, accessed Jan. 19, 2012, <http://www.activant.com/>.

Edmunds.com Estimates Automotive Service Costs for Drivers.—Free Online Library, pp. 1-3, accessed Feb. 8, 2012, <http://www.thefreelibrary.com/Edmunds.com+Estimates+Automotive+Services+Costs+for+Drivers>.

Car Maintenance, car safety reports at Edmunds, p. 1 of 1, accessed Feb. 8, 2012, <http://web.archive.org/web/20011118122544/htt://www.edmunds.com/pro . . . >.

Edmunds.com—Maintenance Popup, p. 1 of 1, accessed Feb. 8, 2012, <http://web.archive.org/web/20021021154557/http://applications.edmunds.com>.

Edmunds.com Estimates Automotive Service Costs for Drivers—Edmunds.com, pp. 1-2, accessed Feb. 3, 2012, <http://www.edmunds.com/about/press/edmundscom-estimates-automotive-service-costs-for-drivers>.

Car Maintenance Schedules, Recalls, and Technical Service Bulletins, pp. 1-2, accessed Feb. 2, 2012, <http://www.edmunds.com/car-maintenance/guide-page.html>.

2000 Volkswagen Passat Maintenance Schedule, pp. 1-2, accessed Feb. 2, 2012, <http://www.edmunds.com/car-maintenance/results.html?year=2000&makeId=20000023&modelYear . . . >.

Reference Library, pp. 1-4, accessed Jan. 25, 2012, <http://www.icarumba.com/shared/Library/encyclopedia/resourcecenter_encyclopedia_>.

Fixthiscar.com Inks Licensing Agreement With Motor Information Systems for Data . . . , pages 1-5, accessed Jan. 10, 2012, <http://www.theautochannel.com/news/2000/09/20/007519.html>.

Fixthiscar.com Announces Premier Online Marketplace for Automotive Repair Information, pp. 1-5, accessed Jan. 10, 2012, <http://www.theautochannel.com/news/2000/09/18/007411.html>.

FindArticles / Business / Business Wire / Oct. 2, 2000, "AutoPlanet Signs Licensing Agreement with Motor Information Systems," pp. 1-2, accessed Jan. 10, 2012, <http://findarticles.com/p/articles/mi_m0EIN/is_200_Oct_2/ai_65637845/>.

Service Price Estimator, pp. 1-3, accessed Jan. 25, 2012, <htttp://www.icarumba.com/mycarumba/vehiclevitals/pricecheck/default.asp>.

Service Details: Printable View, p. 1 of 1, accessed Jan. 25, 2012, <http://www.icarumba.com/mycarumba/vehiclevitals/pricecheck/myca_vehiclevitals_pr . . . >.

* cited by examiner

RepairPrice Estimator

Get an estimate for a service or repair on your car

| | |
|---|---|
| Make: | Volkswagon ▼ |
| Model: | - Select Model - ▼ |
| Year: | - Select Year - ▼ |
| | >> Don't see your car? |
| Service Type: | - Select Service Type - |
| Zip Code: | - Enter Zip Code - |

[Get Estimate]

Fig. 2A

RepairPrice Estimator

Get an estimate for a service or repair on your car

| | |
|---|---|
| Make: | Volkswagon ▼ |
| Model: | Passat ▼ |
| Year: | - Select Year - ▼ |
| | >> Don't see your car? |
| Service Type: | - Select Service Type - |
| Zip Code: | - Enter Zip Code - |

[Get Estimate]

Fig. 2B

RepairPrice Estimator

Get an estimate for a service or repair on your car

| | |
|---|---|
| Make: | Volkswagon ▼ |
| Model: | Passat ▼ |
| Year: | 2000 ▼ |
| | >> Don't see your car? |
| Service Type: | - Select Service Type - |
| Zip Code: | - Enter Zip Code - |

[Get Estimate]

Fig. 2C

Which service do you need?

Maintenance

Scheduled Maintenance
Brake Fluid Replacement/Flush
Fuel Filter Change
Timing Belt Replacement
Oil and Filter Change
Drive Belt(s) Replacement
Air Filter Replacement
Cabin Air Filter Replacement
Automatic Transmission Fluid Change
Rotate Tires
Differential Fluid Replacement - Rear
Coolant Replacement/Flush
Manual Transmission Fluid Change
Ignition Wire Set Replacement

Brakes

ABS Wheel Speed Sensor Replacment
ABS Control Module Replacement
Brake Master Cylinder Replacement
Brake Pad(s) Replacement
Brake Shoe(s) Replacement
Brake Wheel Cylinder Replacement
Brake Pad and Rotor Replacement
Brake Pad Replacement, Resurface Rotors
Brake Shoe and Drum Replacement
Brake Shoe Replacement, Resurface Drums
Brake Caliper Replacement - Front
Brake Caliper Replacement - Rear
Brake Fluid Replacement/Flush

Drive Train

Clutch Assembly Replacement
Clutch Cable Replacement
Clutch Master Cylinder Replacement
Clutch Slave Cylinder Replacment
Axle/Half Shaft Replacement - Front

Engine

Radiator Fan Assembly Replacement
Fuel Filter Change
Fuel Injector Replacement
Fuel Pump Replacement
Ignition Coil Replacement
Radiator Replacement
Spark Plug Replacement
Thermostat Replacement
Timing Belt Replacement
Water Pump Replacement
Radiator Fan Motor Replacement
Mass Airflow Sensor Replacement
Radiator Hose Replacement
Intake Manifold Gasket Replacement
Head Gasket(s) Replacement
Valve Cover Gasket(s) Replacement
Radiator Hose Replacement - Upper
Radiator Hose Replacement - Lower
Oil and Filter Change
Oil Pan Reseal - Engine
Drive Belt(s) Replacement

Exhaust & Emissions

Catalytic Converter Replacement
EGR Valve Replacement
Oxygen Sensor Replacement
Exhaust Manifold Gasket(s) Replacement

Electrical & Lights

Alternator Replacement
Battery Replacement
Headlamp Bulb Replacement
Door Window Motor Replacement
Door Window Regulator Replacement
Starter Replacement

Suspension & Steering

Power Steering Pump Replacement
Steering Rack Replacement
Wheel Bearing Replacement - Front
Strut/Shock Absorber Replacement - Front
Strut Replacement - Rear
Wheel Bearing Replacement - Rear
Ball Joint Replacement - Lower
Tie Rod End Replacement - Outer
Wheel Alignment - 4 Wheels

Heating & Air Conditioning

AC Recharge
AC Compressor Replacement
AC Condenser Replacement
AC Evaporator Replacement
Heater Core Replacement
Heater Control Valve Replacement
Heater Blower Motor Replacement

Fig. 2D

RepairPrice Estimator

Get an estimate for a service or repair on your car

| | |
|---|---|
| Make: | Volkswagon ▼ |
| Model: | Passat ▼ |
| Year: | 2000 ▼ |
| | >> Don't see your car? |
| Service Type: | Alternator Replacement |
| Engine: | - Select Engine - ▼ |
| Mileage: | - Enter Mileage - |
| Zip Code: | - Enter Zip Code - |

[Get Estimate]

Fig. 2E

RepairPrice Estimator

Get an estimate for a service or repair on your car

| | |
|---|---|
| Make: | Volkswagon ▼ |
| Model: | Passat ▼ |
| Year: | 2000 ▼ |
| | >> Don't see your car? |
| Service Type: | Alternator Replacement |
| Engine: | 6 cylinder ▼ |
| Mileage: | - Enter Mileage - |
| Zip Code: | - Enter Zip Code - |

[Get Estimate]

Fig. 2F

RepairPrice Estimator

Get an estimate for a service or repair on your car

| | |
|---|---|
| Make: | Volkswagon ▼ |
| Model: | Passat ▼ |
| Year: | 2000 ▼ |
| | >> Don't see your car? |
| Service Type: | Alternator Replacement |
| Engine: | 6 cylinder ▼ |
| Mileage: | 138000 |
| Zip Code: | 95014 |

[Get Estimate]

Fig. 2G

Car Care Confidence

Alternator Replacement - 6 cylinder
Adjusted for your 2000 Volkswagen Passat near zip code 95014

Brand: Volkswagen
Model: Passat
Year: 2000
Mileage: 138,000

RepairPrice Estimate™
Estimated price range for your repair

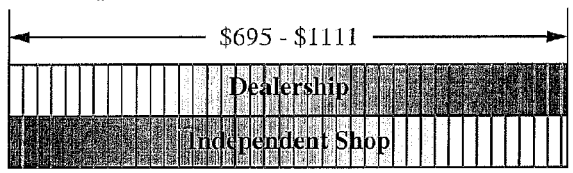

$695 - $1111

Estimate Includes:
(Adjusted for your area and brand)
Parts: $312 - $623
• Alternator
Labor: $383 - $488
(Estimate excludes applicable taxes)
(Diagnostic services not included)

About this Repair
What to watch out for
• The parts for this service on your Volkswagen Passat tend to have a wide range in prices, even for parts of similar quality. You may benefit from checking around to compare the prices at different shops.

Recommendations
• The entire starting and charging system should be inspected before replacing the alternator to eliminate other problems that may be affecting the alternator's performance.
• We recommend replacing the alternator belt with the alternator if it does not require too much additional labor.

Why this happens
• A weak alternator can result in unusually dim headlights.
• The battery may need to be replaced along with the alternator. If the battery does not deliver 10 volts or more in the shop's tests, the vehicle may continue to experience starting problems.
• A failing alternator can result in problems starting the vehicle, and repeated jump starts.

Common Problems for the 2000 Volkswagen Passat

| Brakes | ABS control module failure can cause the ABS light to illuminate. |
|---|---|
| Drive Train | • A problem with the torque converter can cause the Check Engine Light to illuminate.<br>• Our technicians recommend having the constant velocity (CV) boots and CV joints inspected at each service. Servicing torn CV boots early can prevent the need to replace the CV half shaft or CV joint. |
| Engine | Both Engines<br>• Oil leaks from the valve cover gaskets and camshaft chain tensioner gaskets are common.<br>• To prevent possible engine problems, our technicians recommend regular inspection of the water pump and timing belt.<br>1.8T (1.8L 4 Cylinder Turbo)<br>To avoid sludge accumulation inside the engine, our technicians recommend using the proper synthetic oil with the appropriate oil filter. |

Fig. 2H

RepairPal BETA
Car Care Confidence    Estimate   Find a Shop   Cars   Encyclopedia   My Car Admin : RepairPal Estimator:
- Build
- Maintenance
- Note Types
- Procedure Types
- Addon Types Directory:
- Directory
- Shop Reviews
- Shop Groups Content:
- Content
- Car Images Car Types:
- Car Reviews
- Q&A

RAW DATA

Accounts:
- Accounts

Car Definitions:
- Car Trim

Part Definitions:
- Part Types
- Part List Templates

Service Definitions:
- Service Types
- Service Taxonomies
- Service Aliases

Analytics:
- Analytics

Brands

| Brand |
|---|
| Acura |
| Audi |
| BMW |
| Buick |
| Cadillac |
| Chevrolet |
| Chrylser |
| Dodge |
| Ford |
| Geo |
| GMC |
| Honda |
| Hummer |
| Hyundai |
| Infiniti |
| Isuzu |
| Jaguar |
| Jeep |
| Kia |
| Land Rover |
| Lexus |
| Lincoln |
| Mazda |
| Mercedes-Benz |
| Mercury |
| Mini |
| Mitsubishi |
| Nissan |
| Oldsmobile |
| Plymouth |
| Pontiac |
| Porshe |
| Saab |
| Saturn |
| Scion |

Done

Fig. 4A

RepairPal BETA
Car Care Confidence — Estimate  Find a Shop  Cars  Encyclopedia  My Car

Admin : RepairPal

Estimator:
  Build
  Maintenance
  Note Types
  Procedure Types
  Addon Types

Directory:
  Directory
  Shop Reviews
  Shop Groups

Content:
  Content
  Car Images

Car Types:
  Car Reviews
  Q&A

RAW DATA

Accounts:
  Accounts

Car Definitions:
  Car Trim

Part Definitions:
  Part Types
  Part List Templates

Service Definitions:
  Service Types
  Service Taxonomies
  Service Aliases

Analytics:
  Analytics

Done

Brands : Model : Car Detail : Service Type

ABS Control Module Replacement
2002 Acura CL

Service Type -- Status: [Copied ▼]

| | Variation | Source | Parts List | Variant Type | Book Hrs | RepairPal Hrs | Repair Notes |
|---|---|---|---|---|---|---|---|
| — | - | Book | ABS Control Module | | 1.4 | 0.0 | 4 |

Service Type Variants NOT ASSIGNED
If a variant type is missing, email Dashboard Admin.

| | Variation | Catergory |
|---|---|---|
| + | HID/Xenon | Car Detail |
| + | Standard | Car Detail |
| + | Automatic Transmission | Drive Train |
| + | Manual Transmission | Drive Train |
| + | Front | Location |
| + | Inner | Location |
| + | Outer | Location |
| + | Rear | Location |
| + | Both | Quantity |
| + | One | Quantity |

CREATE NEW VARIANT [         ]  [Location ▼]
Copy Across Model: ☐  Brand: ☐  (Save)

CLONE ABS CONTROL MODULE REPLACEMENT  [10,000 Mile Service ▼]
[2002 ▼] to [2002 ▼]  (Save)

Fig. 4C

RepairPal BETA
Car Care Confidence    Estimate  Find a Shop  Cars  Encyclopedia  My Car Admin : RepairPal

Brands

Estimator:
- Build
- Maintenance
- Note Types
- Procedure Types
- Addon Types

Directory:
- Directory
- Shop Reviews
- Shop Groups

Content:
- Content
- Car Images

Car Types:
- Car Reviews
- Q&A

RAW DATA

Accounts:
- Accounts

Car Definitions:
- Car Trim

Part Definitions:
- Part Types
- Part List Templates

Service Definitions:
- Service Types
- Service Taxonomies
- Service Aliases

Analytics:
- Analytics

| Brand |
|---|
| Acura |
| Audi |
| BMW |
| Buick |
| Cadillac |
| Chevrolet |
| Chrylser |
| Dodge |
| Ford |
| Geo |
| GMC |
| Honda |
| Hummer |
| Hyundai |
| Infiniti |
| Isuzu |
| Jaguar |
| Jeep |
| Kia |
| Land Rover |
| Lexus |
| Lincoln |
| Mazda |
| Mercedes-Benz |
| Mercury |
| Mini |
| Mitsubishi |
| Nissan |
| Oldsmobile |
| Plymouth |
| Pontiac |
| Porshe |
| Saab |
| Saturn |
| Scion |

Done

Fig. 4D

METHOD AND SYSTEM FOR DETERMINING SERVICES PRICING

CROSS-REFERENCE TO RELATED APPLICATIONS

This application claims priority to co-pending U.S. Provisional Application Ser. No. 61/060,745, filed Jun. 11, 2008, entitled "METHOD AND SYSTEM FOR DETERMINING SERVICES PRICING," which is hereby incorporated by reference as if set forth herein.

FIELD OF THE INVENTION

The present invention relates generally to the field of price determination. More particularly, the present invention relates to a method of and system for determining pricing for automotive repair.

BACKGROUND OF THE INVENTION

There are currently means for determining the cost of a repair on a car. However, these prior art solutions are limited in their ability to address the needs of ordinary consumers, rather than automotive technicians. For example, U.S. Patent Application Publication No. 2007/0295800 to Staats, entitled "Dynamic Linking of Part Items to Repair Data," is directed towards a system by which an automotive technician looks up components and procedures and puts them all together in an exact estimate, generating an invoice with a specific invoice price that the customer is expected to pay. This system is used on most, if not all, of the leading repair estimation software packages that are used by mechanics today. However, this type of system requires a lot of human intervention and decision-making to go through and select all of the individual components that are going to be used on that specific repair. Someone with automotive expertise must decide what the appropriate procedures and sub-procedures involved in the repair, what are the necessary parts (e.g., belts, gaskets, and other components), whether there is a disposal fee, and things of that sort. In other words, the system merely provides a database through which the user must navigate and make detailed choices about the repair. Therefore, the system is limited by the automotive knowledge of person using it and is designed to be used by an automotive technician, not an ordinary consumer. Furthermore, the system does not provide a range of prices for repair, but rather a specific invoice price. Therefore, the system does not give the user an upper end price and a lower end price to keep in mind when searching for and dealing with repair facilities. The prior art systems assume that the car owner has already found a repair facility, and are thus directed towards being used by someone who works at the repair facility instead of the car owner.

SUMMARY OF THE INVENTION

The present invention is designed to allow non-technical car owners to provide basic, commonly understood input information in order to drive a detailed price estimate for an anticipated repair. The present invention dramatically reduces the amount of decision-making and overall effort on the part of the user by implementing rules to determine the appropriate repair procedures and parts and by using statistical and estimation techniques to parameterize the range of potential parts that could be used in a repair, as well as the labor components.

In a preferred embodiment, the present invention is provided as a web-based application accessed through a web browser. However, it is contemplated that it may be provided in other forms as well. In some embodiments, the system provides online automotive maintenance and cost estimation and management for consumers and businesses, and includes several interrelated components that operate as a complete online consumer vehicle management system.

In some embodiments, the system includes a repair price estimator that provides proprietary price estimates for standard automotive repairs and services customized for the user's geography, mileage and service channel.

In some embodiments, the system includes a repair shop directory that provides a comprehensive directory of repair facilities across the United States for all categories of automotive service providers, searchable to facilitate the user finding their preferred combination of price, service, and specialty.

In some embodiments, the system includes satisfaction, value and surprise-factor ratings that give a consumer visibility into a shop's level of consumer satisfaction, how likely it is to find additional services to perform on a customer's vehicle, and how the shop's prices charged compare with other comparable shops and with the prices forecast by the repair price estimator.

In some embodiments, the system includes a maintenance minder that sends digital reminders to users with specific services recommended by their car's manufacturer, including oil changes, scheduled maintenance, recalls and other safety alerts. E-mails may also include coupons and other special offers.

In some embodiments, the system includes an online services record that provides users with a web page dedicated to each specific vehicle, serving as a repository for an online service record of vehicle service performance metrics, preferred service providers, and upcoming repairs.

In some embodiments, the system includes a repair-or-replace calculator that provides users with an online tool that assesses the cost of a needed repair and compares it with the market value of the vehicle in question.

In one aspect of the invention, a method of determining services pricing is provided. The method comprises a server receiving vehicle identification information from a user via a network connection, wherein the vehicle identification information indicates a vehicle type. In some embodiments, the vehicle identification information comprises make, model, and year for a vehicle. The server also receives service type information from the user via the network connection, wherein the service type information indicates a service type. The server determines an estimate range based on the vehicle identification information and the service type information. The estimate range comprises a minimum value and maximum value for the indicated vehicle type and service type. Determining the estimate range comprises determining a labor estimate and a parts estimate. The server provides the estimate range to the user via the network connection.

In some embodiments, the labor estimate comprises a range having a minimum and maximum value. In some embodiments, the parts estimate comprises a range having a minimum and maximum value. In some embodiments, the labor estimate and the parts estimate each comprise a range having a minimum value and a maximum value.

In some embodiments, the method further comprises the step of the server receiving location information from the user. The server uses the location information to determine the estimate range. In some embodiments, the location information comprises a zip code. In some embodiments, determining the labor estimate comprises using an econometric model to forecast a base labor rate for the location received from the user. In some embodiments, using the econometric model comprises employing an ordinary least squares estimator. In some embodiments, determining the labor estimate further comprises applying a ratio to the base labor rate. The ratio is determined based on information received from the user. In some embodiments, the ratio is determined based on location information received from the user.

In some embodiments, the server prompts the user to provide variant information in response to receiving particular predetermined vehicle identification information or service type information. In some embodiments, the variant information comprises mileage or engine type. In some embodiments, the server uses the variant information to determine the estimate range.

In another aspect of the present invention, a program storage device is provided. The program storage device is readable by a machine, tangibly embodying a program of instructions executable by the machine to perform a method of determining services pricing for use in a system over a network. The network is connected to a server, thereby allowing communication between the server and a user on a client device. The method comprises the server receiving vehicle identification information from the user, wherein the vehicle identification information indicates a vehicle type. In some embodiments, the vehicle identification information comprises make, model, and year for a vehicle. The server receives service type information from the user, wherein the service type information indicates a service type. The server determines an estimate range based on the vehicle identification information and the service type information. The estimate range comprises a minimum value and maximum value for the indicated vehicle type and service type. Determining the estimate range comprises determining a labor estimate and a parts estimate. The server provides the estimate range to the user.

In some embodiments, the labor estimate comprises a range having a minimum and maximum value. In some embodiments, the parts estimate comprises a range having a minimum and maximum value. In some embodiments, wherein the labor estimate and the parts estimate each comprise a range having a minimum value and a maximum value.

In some embodiments, the method further comprises the step of the server receiving location information from the user, wherein the server uses the location information to determine the estimate range. In some embodiments, the location information comprises a zip code. In some embodiments, determining the labor estimate comprises using an econometric model to forecast a base labor rate for the location received from the user. In some embodiments, using the econometric model comprises employing an ordinary least squares estimator. In some embodiments, determining the labor estimate further comprises applying a ratio to the base labor rate, wherein the ratio is determined based on information received from the user. In some embodiments, the ratio is determined based on location information received from the user.

In some embodiments, the method further comprises the server prompting the user to provide variant information in response to receiving particular predetermined vehicle identification information or service type information. In some embodiments, the variant information comprises mileage or engine type. In some embodiments, the server uses the variant information to determine the estimate range.

In yet another aspect of the invention, a method of managing a services pricing determination system is provided. The method comprises a server providing an administrator with an administrative interface via a network connection to the administrator's client device. The administrative interface allows the administrator to save rules for labor information and part information at varying levels of specificity. The server receives vehicle identification information from a user via a network connection, wherein the vehicle identification information indicates a vehicle type. The server receives service type information from the user via the network connection, wherein the service type information indicates a service type. The server determines an estimate range based on the vehicle identification information and the service type information. The estimate range comprises a minimum value and maximum value for the indicated vehicle type and service type. Determining the estimate range comprises determining a labor estimate and a parts estimate. Determining the labor estimate comprises applying the saved rules for labor information and determining the part estimate comprises applying the saved rules for part information. The server provides the estimate range to the user via the network connection.

In some embodiments, one level of specificity is across every vehicle for a particular make regardless of model and year, and another level of specificity is for a vehicle of a particular make, model, and year. In some embodiments, the level of specificity can vary between any permutation of make, model, and year.

In some embodiments, the labor estimate and the parts estimate each comprise a range having a minimum value and a maximum value. In some embodiments, determining the labor estimate comprises using an econometric model to forecast a base labor rate for a location, the location being based on location information received from the user. In some embodiments, using the econometric model comprises employing an ordinary least squares estimator. In some embodiments, determining the labor estimate further comprises applying a ratio to the base labor rate, wherein the ratio is determined based on either location information or vehicle identification information received from the user.

In some embodiments, the server prompts the user to provide variant information in response to receiving particular predetermined vehicle identification information or service type information according to one or more of the saved rules. In some embodiments, the server uses the variant information to determine the estimate range.

In yet another aspect of the invention, a program storage device is provided. The device is readable by a machine, tangibly embodying a program of instructions executable by the machine to perform a method of determining services pricing for use in a system over a network. The network is connected to a server. The method comprises the server providing an administrator with an administrative interface via a network connection to the administrator's client device, wherein the administrative interface allows the administrator to save rules for labor information and part information at varying levels of specificity. The server receives vehicle identification information from a user via a network connection, wherein the vehicle identification information indicates a vehicle type. The server receives service type information from the user via the network connection, wherein the service type information indicates a service type. The server determines an estimate range based on the vehicle identification information and the service type information. The estimate range comprises a minimum value and maximum value for the indicated vehicle type and service type. Determining the estimate range comprises determining a labor estimate and a parts estimate. Determining the labor estimate comprises applying the saved rules for labor information and determining the part estimate comprises applying the saved rules for part information. The server provides the estimate range to the user via the network connection.

In some embodiments, one level of specificity is across every vehicle for a particular make regardless of model and year, and another level of specificity is for a vehicle of a particular make, model, and year. In some embodiments, the level of specificity can vary between any permutation of make, model, and year.

In some embodiments, the labor estimate and the parts estimate each comprise a range having a minimum value and a maximum value. In some embodiments, determining the labor estimate comprises using an econometric model to forecast a base labor rate for a location, the location being based on location information received from the user. In some embodiments, using the econometric model comprises employing an ordinary least squares estimator. In some embodiments, determining the labor estimate further comprises applying a ratio to the base labor rate, wherein the ratio is determined based on either location information or vehicle identification information received from the user.

In some embodiments, the server prompts the user to provide variant information in response to receiving particular predetermined vehicle identification information or service type information according to one or more of the saved rules. In some embodiments, the server uses the variant information to determine the estimate range.

BRIEF DESCRIPTION OF THE DRAWINGS

FIGS. 2A-H are screenshots illustrating one embodiment of different stages of the price estimate determination in accordance with the principles of the present invention.

FIGS. 4A-D are screenshots illustrating one embodiment of different stages of creating and managing the price estimation system in accordance with the principles of the present invention.

DETAILED DESCRIPTION OF THE INVENTION

Figure 1:
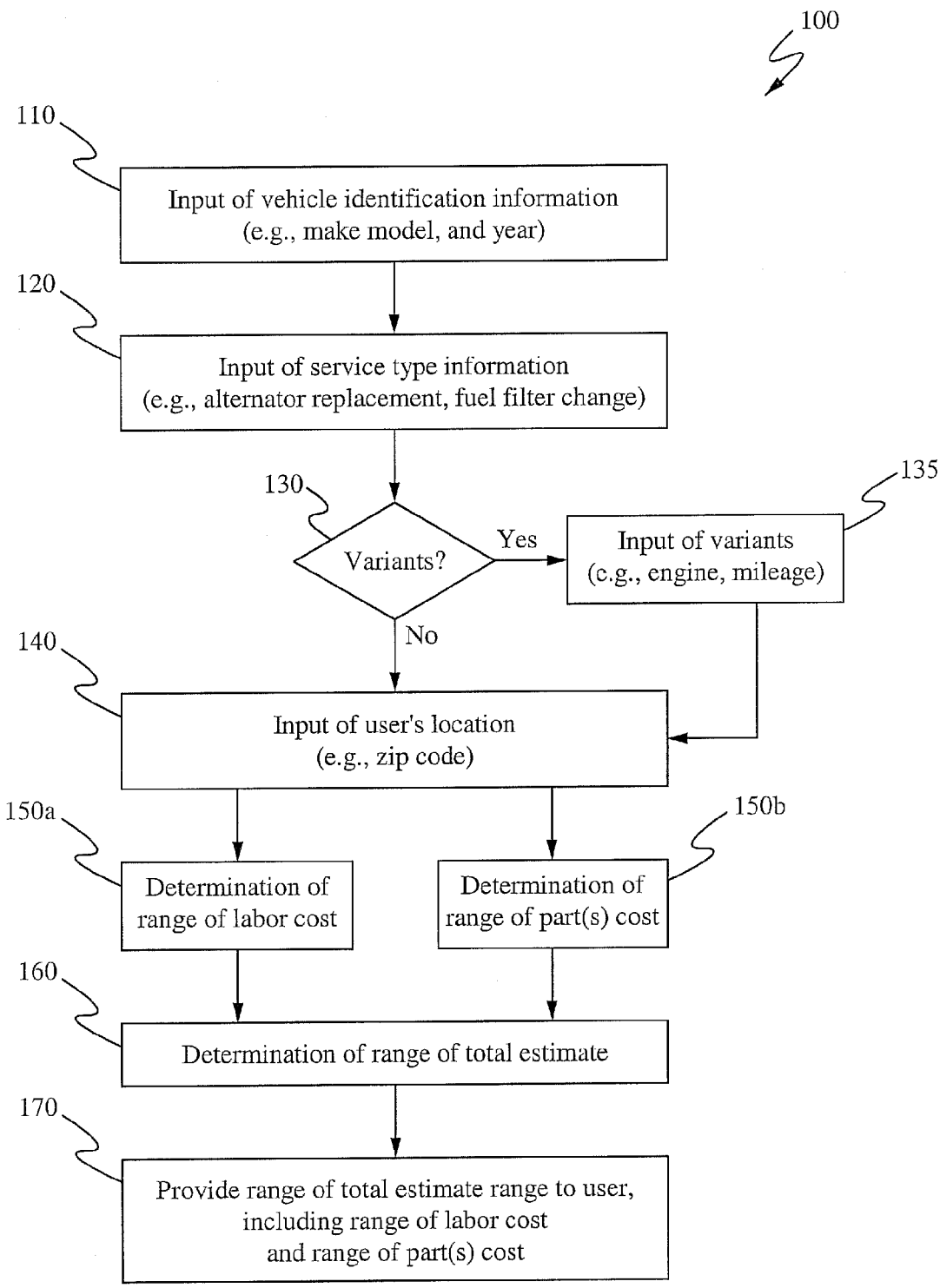
FIG. 1 is a flowchart illustrating one embodiment of a method of determining a price estimate in accordance with the principles of the present invention.

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

In a preferred embodiment, the steps of the present invention are embodied in machine-executable instructions. These instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, ROMs, RAMs, magnet or optical cards, or other type of media/machine-readable medium suitable for storing electronic instructions.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure beyond what is recited in the claims.

One of the main features of the present invention is the repair price estimator. In some embodiments, the system provides proprietary price estimates for more than 100 automotive repairs and services on hundreds of automobile models from 1990 and on, customized for the user's geography (e.g., by 465 Metropolitan Statistical Areas (MSA's) and 41,700 zip codes) and service channel (dealer or independent shop). The system is designed to allow non-technical car owners to provide basic, commonly understood input information that drives a detailed, specific price estimate for an anticipated repair. In some embodiments, this online auto repair price estimator matches the make, model and year of a vehicle with a proprietary database of dealer and aftermarket auto and truck parts prices for a particular service, then matches the appropriate parts with a proprietary database of labor times provided by a vendor with sufficient experience (e.g., 30 plus years) in providing labor times from the major manufacturers, such as the original equipment manufacturers (OEM). It then determines a labor price calculated according to the user's brand, location and service channel (dealer or independent shop). These steps result in the presentation of an accurate estimate of such repair to the consumer, expressed as a range delineating the parts and labor price breakdowns and typical sub-ranges for dealerships and independent mechanics within the larger range.

FIG. 1 is a flowchart illustrating one embodiment of a method 100 of determining a price estimate in accordance with the principles of the present invention. Although FIG. 1 illustrates certain steps being performed in a certain order, it is contemplated that the order of the steps can vary. FIGS. 2A-H are screenshots illustrating examples of different stages of the estimate determination process that are visible to and, in some cases, capable of being interacted with by the user.

At step 110, the user inputs vehicle identification information into the system. In a preferred embodiment, the user enters the make, model and year of the vehicle in need of service. This entry of vehicle identification information can be implemented in a variety of ways. In one embodiment, the user is presented with a selector screen. As seen in FIG. 2A, the system provides an interface through which the user can select the make of the vehicle (e.g., Volkswagen). As seen in FIG. 2B, the user can then select the model of the vehicle (e.g., Passat). As seen in FIG. 2C, the user can then select the year of the vehicle (e.g., 2000). In some embodiments, the user can make these selections through the use of a drop-down menu. However, it is contemplated that other selection means are within the scope of the present invention, including, but not limited to, a list of hyperlinked items and search term entry boxes. This flexibility in the use of selection means applies to all of the other user input steps of the present invention.

At step 120, the user inputs information regarding the type of service that is to be performed on the vehicle. This entry of service type information can be implemented in a variety of ways. In one embodiment, such as that shown in FIG. 2D, the user is presented with a list of different types of available services that can be performed on the vehicle. In some embodiments, this list is influenced by the vehicle identification information previously entered by the user. For example, certain services might be available for one vehicle, but not for another. As seen in FIG. 2D, the list can separate the services into categories in order to help the user find the appropriate service. In this particular embodiment, the user would click on the appropriate service, such as "Alternator Replacement" under the "Electrical & Light" category heading. As seen in FIG. 2E, the selection of a particular service can bring the user back to a main selector screen that shows all of his or her selections up to this point.

At step 130, it is determined whether or not the user needs to make any variant selections. In some embodiments, this determination is made based on one or more of the previous selections made by the user. If there are no variants that need to be selected, then the method proceeds to step 140, which will be discussed below. If there are variants that need to be selected, then the user enters the appropriate variant information. Examples of variant information include, but are not limited to, engine type and mileage. As seen in FIG. 2E, the selection of "Alternator Replacement" for a 2000 Volkswagen Passat, results in the user having to select the appropriate engine type (e.g., 6 cylinder or 4 cylinder) and enter the appropriate mileage. FIG. 2F is a screenshot illustrating an embodiment where the user has selected a 6 cylinder engine using a drop-down menu. FIG. 2G is a screenshot illustrating an embodiment where the user has entered 138,000 for the mileage using a data entry box. As discussed above, the selection/input of this information can be implemented in a variety of ways other than those provided in this disclosure.

At step 140, the user inputs the location where he or she desires the service to be performed. In a preferred embodiment, the user enters a zip code. However, it is contemplated that other location information can be provided in order to satisfy the location aspect of the price estimation. FIG. 2G is a screenshot illustrating an embodiment where the user has entered 95014 for the zip code using a data entry box.

Once all of the appropriate information has been input into the system by the user, the system then proceeds to use this information to build the total estimate. In a preferred embodiment, the total estimate is provided in the form of a range, having a minimum value and a maximum value, and comprises two main cost components, labor and time. Preferably, a range having a minimum vale and a maximum value is determined for both the labor component and the time component. In some embodiments, the estimate is built in the following manner:

estimate=labor cost+part(s) cost+special adjustments labor cost=labor time(hours)×labor rate($/hours)

part(s) cost=wholesale parts price($)×(1+parts margin (%))

At step 150a, the system determines the labor cost. As shown above, the labor cost preferably involves the amount of time required to perform the service on the vehicle and the labor rate charged by the shop performing the service. The present invention utilizes an econometric model to generate a labor rate that takes into account the user's vehicle make, location, and service channel. It uses advanced statistical techniques on thouosands of real-world data points (gained through surveys and analyses of actual repair invoices) to refine and test the econometric model. The model's output is combined with a proprietary database of the actual labor repair times used by technicians to estimate and charge for a job.

In some embodiments, labor time figures are provided by a vendor with several years (e.g., 30 plus years) in the business, and a solid reputation for quality products. The system can obtain its labor time data from each individual OEM.

In some embodiments, the system includes a model for generating a labor rate that takes into account any one or combination of the user's make, location, and service channel. Preferably, the system uses advanced statistical techniques on thousands of real-world data points (gained through surveys and analyses of actual repair invoices) to refine and test the model. The model's output is combined with a proprietary database of the actual labor repair times used by technicians to estimate and charge for a job.

In some embodiments, the system performs a method of estimating automotive retail labor rates for every combination of auto brand, service channel and zip code and/or neighborhood in the US, based on government and private party economic and demographic information, and may also include proprietary brand and channel factors described below. The labor rate model can calculate an average labor rate for every MSA (metropolitan statistical area) in the US.

Labor rates can be estimated in a variety of ways. In some embodiments, thousands of actual labor rates are collected from dealers and independent shops all around the country and across all brands. An econometric model is then constructed using economic, demographic and industry wage data to fit the observed labor rates. The econometric model can be built in a variety of ways. In some embodiments, the model is built using one or more forms of regression analysis. For example, in some embodiments, the model is built using an ordinary least squares estimator or a logit model or a combination of the two. It is contemplated that other forms of regression analyses and model construction can be employed as well in order to build the econometric model. With that econometric model, base labor rates are forecast for all 42,000 zip codes in the United States. A set of ratios that represent the differences in rates for each brand in relation to the base rate can then be applied to get the specific forecast for the labor rate paid by a consumer with a specific brand of car in that zip code.

For example, in some embodiments, telephone surveys are taken from a random assortment of shops, both dealers and independents, and used to derive brand factors and average dealer premium versus independent shop rates. The brand factors include a % deviation from an average labor rate for an area for each brand (e.g., BMW technicians charge A % above the average rate, while Dodge technicians charge B % below the average). Regarding the average dealer premium versus independent shop rates, a dealer in a particular area charges X % more for a job than an independent shop, all other factors held constant. Additionally, econometric modeling is used to link observed labor rates with economic and demographic data from proprietary and US government sources.

The result of the system's econometric model is a highly accurate set of labor rate estimates that account for a shop's location, the car's brand, and the service channel used (dealer or independent). As previously mentioned, the labor cost is preferably provided as a range having a minimum value and a maximum value. Typically, the independent shops represent the lower end of the range, while the dealers represent the upper end of the range.

At step 150b, the system determines the labor cost. In some embodiments, a parts list for each procedure in the repair price estimator is selected by certified technicians and auto parts professionals for each service channel, both OEM and aftermarket. The list is then vetted to eliminate outlying parts and associated prices, then fed into a database. Parts are categorized into buckets corresponding to the magnitude of the spread of prices for that part category (e.g., catalytic converters have wide spreads on prices, while spark plugs have narrow ranges). The net result is a price range established for every part, with modifiers that indicate if there are a larger or smaller number of outlying data points than is typical within the set of all price point data. That price range can then be used as the part(s) cost in the total price estimate. The system can use a set of logic and rules, established by the administrator or technician, that determine the appropriate part(s) for each procedure.

At step 160, the system determines the total estimate, preferably in the form of a range. This total estimate can be determined by adding the determined labor cost to the determined part(s) cost. For example, the minimum value of the labor cost can be added to the minimum value of the part(s) cost in order to determine the minimum value of the total estimate. Similarly, the maximum value of the labor cost can be added to the maximum value of the part(s) cost in order to determine the maximum value of the total estimate.

At step 170, the system provides the total estimate to the user, preferably in the form of a range. In some embodiments, the system provides the total estimate, along with a breakdown of the labor cost and the part(s) cost. FIG. 2H is a screenshot illustrating one embodiment of an estimate being provided to the user. As can be seen, the system provides the total estimate in range form ($695-$1111), and includes a graphic representation of where independent shops and dealerships are located within that range. The graphical representation uses differently shaded bars to illustrate that the independent shops are more heavily weighted towards the lower end of the estimate, while the dealerships are more heavily weighted towards the upper end of the estimate. The system also provides the user with the part(s) cost in range form ($312-$623) and the labor cost in range form ($383-$488). Although, FIG. 2H shows the system providing both the total estimate and the breakdown of the labor cost and the part(s) cost, it is contemplated that the system can provide any one or combination of these elements.

Along with the repair/service estimate, the system can provide the user with diagnostic service content related to his or her vehicle. The diagnostic content explains to the user why the queried repair or service needs to be performed. As seen in FIG. 2H, the additional service notes can inform the user of what other problems or matters to look out for, make recommendations, and explain to the user why the issue with his or her car is happening. Additionally, the system can provide a list of common problems for the user's vehicle. FIG. 2H shows a part of such a list, which is organized by problem categories, such as brakes, drive train, and engine.

The system can inform the user of all the other things that he or she might need to have done when service is performed. For example, if the user is having the water pump replaced and car has more than 50,000 miles, a competent mechanic will suggest that the timing belt should be replaced because it will need to be replaced fairly soon (typically, at around 60,000 miles). If the user doesn't know that is a fairly standard procedure, he or she might think that the mechanic is trying to rip him or her off, even though the mechanic is just doing his or her job by being proactive. The mechanic is actually saving the person money since the front of the engine has already been taken apart to replace the water pump and he won't have to charge for all of that labor again in 8,000 miles. In the present invention, the system gives the user relevant useful information at the most useful time, which is before he or she goes in for the repair or service.

In some embodiments, the system provides sponsored listings (e.g., name and contact information) of shops in the user's area that work on the user's brand of car. These listings are preferably provided along with and next to the repair price estimate. Along these lines, in some embodiments, the system provides an online directory of auto service facilities that allows a user to identify the optimal provider to service his vehicle, based on the provider's location, historical pricing patterns, level of customer satisfaction, and brand and functional expertise. The user can rank these input parameters as desired, prioritizing certain parameters over others. The user can also input an intended destination (e.g., school, workplace, etc.) to increase the set of potential qualified service providers that are equally convenient.

The system can also provide a rating system for automotive service facilities that asks recent customers to provide feedback regarding service quality, price, and the accuracy of any initial service estimates. Users can view aggregated individual feedback as satisfaction, value and estimate accuracy ratings. This feedback can be acquired by the system using follow-up e-mails, or any other means of online data gathering. Such a follow-up e-mail can state the details of the user's recent visit to the system website (e.g., price estimate for an alternator replacement on a 2001 Honda Accord in Cleveland, Ohio). It can include questions such as: Did you have the above procedure performed? Any other procedures? Where did you have the work performed? How satisfied were you with the quality of the service you received? Was your final bill for this work in the range of, higher than, or lower than the estimate? How far from the original estimate was the final amount you paid? The e-mail can include links, drop-down menus, or any other means to help the user in selecting or entering answers to these questions. It is contemplated that the system can be updated using the user's answers to these questions. In some embodiments, these updates can be manual. In some embodiments, these updates can be automated. For example, if a particular threshold is met for a final bill being above or below the estimate, an administrator can be notified to update the system information (e.g., labor cost, part(s) cost, shop directory, etc.), or the system can automatically update the information based on a set of rules and parameters.

Figure 5:
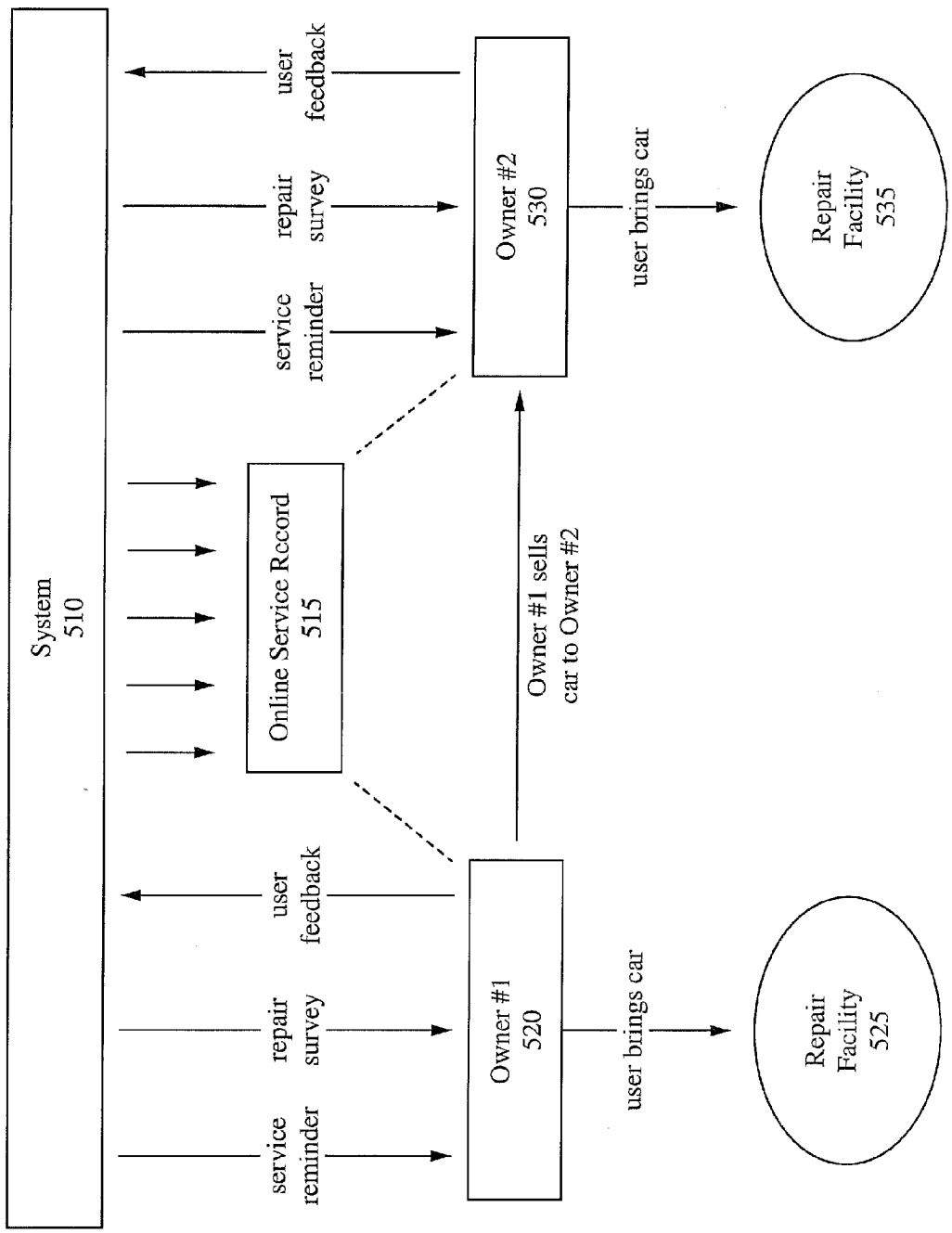
FIG. 5 is a block diagram illustrating one embodiment of the operation of a maintenance minder and the maintenance of an online service record in accordance with the principles of the present invention.

In some embodiments, the system provides an integrated online vehicle service management system for consumers and businesses in the form of a maintenance minder and online service record for a user's vehicle. The system can send digital reminders to users for specific time- and mileage-appropriate services and/or actions recommended by the car's manufacturer (OEM), including oil changes, scheduled maintenance, recalls, and other service or safety alerts. E-mails may also include coupons, rebates, and other special offers. The system provides an online service record for each individual vehicle. The online record serves as a repository for data associated with every visit to a repair facility, populated by the vehicle owner and/or each participating service provider. The user can also view financial and service frequency performance metrics, preferred service provider rankings, and a forecast of services and associated costs, all specific to each vehicle and the geography in which it is serviced. FIG. 5 is a block diagram illustrating one embodiment of the operation of a maintenance minder and the maintenance of an online service record in accordance with the principles of the present invention. As discussed above, the system 510 maintains an online service record 515 for a user's vehicle. For example, let's say that Owner #1 (520) owns the vehicle and is a user of the system 510. Owner #1 can use the system 510 to obtain a price estimate for a needed service/repair on the vehicle. The system 510 might send the user a service reminder letting him or her know that it is time for a particular service on the vehicle. After Owner #1 brings the vehicle to a repair facility or service shop 525, the system might send Owner #1 a repair survey, asking the owner questions related to the estimate and the service provided. Owner #1 can then provide the system 510 with the appropriate feedback. The system 510 can use this feedback from Owner #1 to update the vehicle's online service record 515. If Owner #1 sells the vehicle to Owner #2 (530), the system 510 can maintain the same online service record 515 for the vehicle so that Owner #2 can view the relevant information and so that the system 510 can continue to provide accurate information for the vehicle, such as timely service reminders. Owner #2 can then go on to use the system 510, taking advantage of the pre-existing online service record 515 for the vehicle and utilizing all of the same services of the system 510 that Owner #1 used.

In some embodiments, the system provides a repair or replace calculator. This online tool allows a user to determine if it is in his or her economic interest to repair his or her vehicle or if the vehicle should be replaced. Preferably, the calculator uses an estimated price to perform a specific repair or service on a specific make, model and year vehicle in a specific location (i.e., output from the repair price estimator described above), and compares that estimated price plus a forward looking (e.g., 12-month or 18-month) maintenance cost estimate with the market value of the vehicle, which can be expressed as trade-in or private party value of the vehicle (derived from a separate, $3^{rd}$ party data source). The user is then encouraged to take an action appropriate to the decision they've made. Examples of recommended actions include registering to sell the vehicle and scheduling a visit to a repair facility. See Exhibit #4. (based on the vehicle's location, model and mileage). The repair or replace calculator gives the user hard facts on whether it makes sense to repair the vehicle or buy a different vehicle. In some embodiments, the system uses data on the frequency and probability of repairs for a given period of time (e.g., the next 18 months), calculates an estimate for all of those repairs over that period of time, and gives the user an idea of how much his or her car is going to cost to maintain. In some embodiments, this estimate is based on the vehicle's make, model, year, mileage, and potential variants (e.g., V6 or V4 engine).

The price estimation system and the maintenance minder of the present invention involve the use of a rather unique data set. However, it is not just the data set or the system's use of this data set that is unique, but also its assembly and organization as well. When you look at all of the different permutations of make, model, year that are put together in determining the price estimate, it takes a monumental effort to input and organize this information into the system. The present invention includes a special interface that an automotive mechanic or technician can sit in front of and assemble all of the repair procedures on a procedure-by-procedure basis in a scalable manner. The interface allows the user to record a set of logic and rules that would apply to a part type. The user can record and save algorithmic logic for every single part. Sometimes the logic is saved at the general part level. Sometimes it is saved at a more specific level (e.g., brand, make, model, year).

In order to enable this enhanced ability, items sometimes need to be saved at an extreme level of detail (e.g., a 1995 Honda Accord with a V6 engine, automatic transmission, and air conditioning) because every aspect might change something about the repair, such as the labor time or parts. In other cases, items need to be save very basically. For example, labor time might be the same for every model and year Honda for a specific type of repair (e.g., gas struts on a truck). Therefore, the interface needs to be capable of storing things at a ridiculously finite level of detail, but also across a whole level of things. Such an ability can be referred to as "saving up and across as necessary." Without this special interface, creating the price estimation system of the present invention becomes an extremely arduous and somewhat impractical task. Even if you remove the zip code factor from the estimate, you are still talking about ½ billion or so car combinations. If a technician had to save a set of information for ½ billion things, it would take ridiculously long to complete.

The administrative interface of the present invention allows technicians to walk through every single repair for every single make, model and year of car on the road and think about those choices in advance and record and save them as appropriate. When it's possible to save an item with scale across similar cars (e.g., same make or same model or same year), it can be saved with scale. When it is necessary to save the specific differences, you can also save the differences in a very exact and focused way. So far, there has been no data set or algorithmic system that has provided these features.

In some embodiments, the system provides a custom-built interface for the selection of automotive parts, labor time variants, and expert insights in which they are combined to create specific repair procedures applicable to consumers. It aggregates disparate data sources, presents their complexity on a single page viewable by an automotive technician, and allows that technician to apply expert logic and insight to combine the elements in a meaningful manner. All of the individual elements of a procedure, such as those specified above, are applied across automobile makes, models, years, and sub-variants as appropriate for the scope of the procedure.

Figure 3:
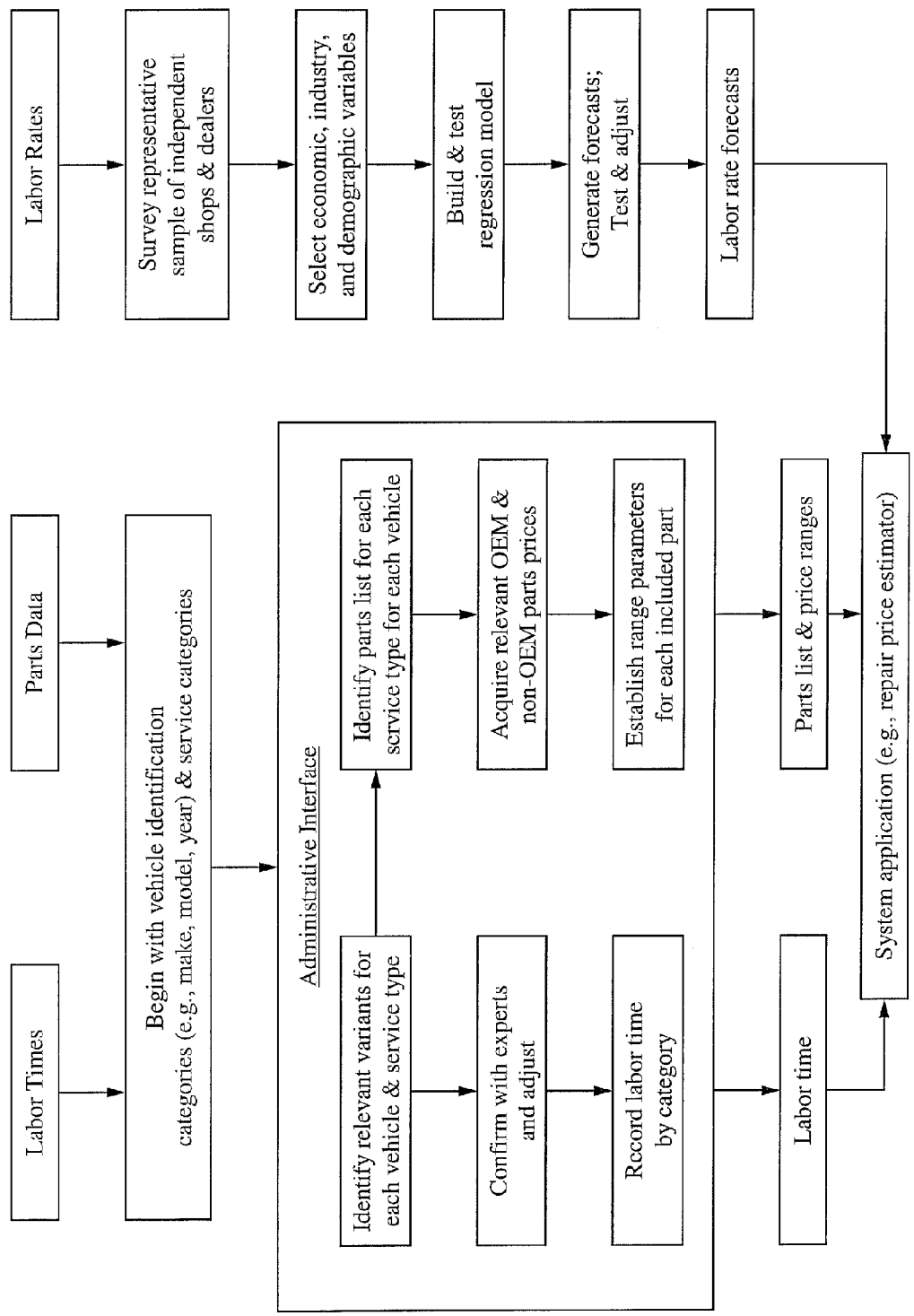
FIG. 3 is a block diagram illustrating one embodiment of creating a price estimation system in accordance with the principles of the present invention.

FIG. 3 is a block diagram illustrating one embodiment of creating a price estimation system in accordance with the principles of the present invention. The three main components that make up the repair price estimate are the labor times for a service, the parts data associated with that service, and the labor rates for performing that service.

In establishing and maintaining the labor times and parts data in the system, both components begin with the administrator/technician establishing vehicle identification categories and service categories. In some embodiments, the vehicle identification categories are make, model, and year. Examples of service categories include alternator replacement, fuel filter change, and rotate tires. In a preferred embodiment, the administrator/technician uses the administrative interface of the present invention in order to implement the creation of the data set incorporated into the system, since the number of permutations of vehicles, services, and parts is incredibly large.

Using the administrative interface, the administrator/technician identifies relevant variants for each vehicle (preferably, for each make, model, and year) and service type. As previously discussed, examples of relevant variants can include, but are not limited to, engine type and mileage.

For the labor time, the administrator/technician confirms the labor time for whatever entry he or she is making, whether it is being made broadly across several types (e.g., all Acuras) or narrowly for a specific make, model and year (e.g., 2002 Acura CL with V6 engine). Upon confirming the labor time (preferably with experts), any necessary adjustments are made. The labor time is then recorded and saved for the appropriate vehicle types (i.e., make, model, year, and variants). As mentioned above, the labor time can be saved broadly across several types or narrowly for a specific type. This entered labor time can then be used by any of the system applications, such as the repair price estimator, for the appropriate vehicle and service type. For the parts data, the administrator/technician identifies a parts list for each service type for each vehicle. The administrator/technician then takes the relevant OEM and non-OEM parts prices that he or she has acquired and establishes range parameters for each included part for the specified service and vehicle. These range parameters can be saved broadly or narrowly within the system. The range parameters are designed to exclude any parts prices that are unacceptably high or unacceptably low. These part price range parameters can then be used by any of the system applications, such as the repair price estimator, for the appropriate vehicle and service type. In the prior art, if a mechanic were searching for an alternator on a 2005 Honda Accord, he or she would not get back a list of all available parts in the area with different quality levels. Instead, the mechanic would get something similar to what a search engine, such as Google, would provide, which is everything that the system associated with the keyword "alternator": alternator, alternator bracket, alternator wiring harness, alternator pin, alternator bolt, and much more. The mechanic would need to pick the part he or she needs and pull price out of it. The present invention employs an algorithmic parts selection engine that can look at that list you would normally get back, ignore the parts that aren't relevant, and choose the parts that are relevant (e.g., ignore both the fancy $400 racing alternator and the cheap $50 alternator). It provides the user with a set of parts that is representative of the parts that mechanics would typically use and ignores the ridiculous high and ridiculous low end.

For the labor rates, surveys can be conducted of a representative sample of dealers and independent shops to find out their rates. Economic, industry, and demographic variables are selected to reflect the difference in labor rates. A regression model based on the survey results and these variables is then built and tested. Forecasts are generated, tested, and adjusted as necessary. Once the model has been fine tuned, it can be implemented in the system to generate labor rate forecasts for the appropriate vehicle and location for use in any of the system applications, such as the repair price estimator.

FIGS. 4A-D are screenshots illustrating embodiments of different stages of creating the price estimation system using the administrative interface in accordance with the principles of the present invention.

FIG. 4A is a screenshot illustrating how an administrator or automotive technician can easily select a brand (make) of vehicle for creation of a labor time and parts entry using the unique administrative interface of the present invention. Here, the vehicle brands are already available.

Figure 4B:

FIG. 4B is a screenshot illustrating how an administrator or automotive technician can easily select a model and year of a vehicle for creation of a labor time and parts entry using the unique administrative interface of the present invention. Here, the vehicle models are already available. The interface shows how many service types have already been established for each vehicle model.

FIG. 4C is a screenshot illustrating how an administrator or automotive technician can easily create a service type using the unique administrative interface of the present invention. As can be seen, the interface provides a list of parts that are required (ABS Control Module) for a particular service (ABS Control Module Replacement for a 2002 Acura CL) and how many hours of labor (1.4) are associated with each part. The interface also shows if any variants have been assigned, and allows the administrator/technician to create a new variant. The administrator can select from variants that have already been provided. The interface also allows the administrator/technician to copy a variant across a particular model (CL) or brand (Acura). The administrator can even select the years to be associated with the variant.

An administrator or automotive technician can easily create a labor time and parts entry using the unique administrative interface of the present invention. The administrator can enter the appropriate labor time associated with a service. The interface also allows the administrator to easily select the level of specificity for which to save the labor time. For example, the administrator can save the entry for only one specific model (e.g., CL), for a selected group of models (e.g., any combination of CL, CSX, EL, Integra, Legend, MDX, etc.), or for all models. The administrator can also save the entry for a particular year, for a selected range of years, or for all years. The interface provides the same ability to the administrator for the parts list as well. The administrator can add a new part to the part list for a particular service, such as by selecting a part from a drop-down menu or by typing in a part name. Similar to the labor time, the interface allows the administrator to easily select the level of specificity for which to save the parts data, such as for model(s) and/or year(s) of the administrator's choosing.

The administrative interface can also provide a summary of a particular make, model, and year vehicle. The summary can include all of the service types for which entries have been made, the number of their associated parts, their associated labor times, and the number of their associated service notes.

FIG. 4D is a screenshot illustrating how an administrator or automotive technician can easily select a brand (make) of vehicle for maintenance of the system's data set using the unique administrative interface of the present invention. The vehicle brands are readily available for selection by the administrator.

An administrator or automotive technician can easily select a model and year of vehicle for maintenance of the system's data set using the unique administrative interface of the present invention. The vehicle models and years are readily available for selection by the administrator.

An administrator or automotive technician can easily select a particular service type for a particular make and model of vehicle in order to update a labor time and parts entry using the unique administrative interface of the present invention. The service types are readily available for selection by the administrator.

An administrator or automotive technician can easily update a labor time and parts entry using the unique administrative interface of the present invention. The administrator can enter the appropriate labor time associated with a service. The interface also allows the administrator to easily select the level of specificity for which to save the labor time. For example, the administrator can save the entry for only one specific model (e.g., CL), for a selected group of models (e.g., any combination of CL, CSX, EL, Integra, Legend, MDX, etc.), or for all models. The administrator can also save the entry for a particular year, for a selected range of years, or for all years. The interface provides the same ability to the administrator for the parts list as well. The administrator can add a new part to the part list for a particular service, such as by selecting a part from a drop-down menu or by typing in a part name. Similar to the labor time, the interface allows the administrator to easily select the level of specificity for which to save the parts data, such as for model(s) and/or year(s) of the administrator's choosing.

The present invention provides an administrative interface that enables the creation and maintenance of a system that would otherwise be impractical to implement given the incredible amount of data entry required.

Furthermore, instead of relying on a mechanic to select specific parts and apply their specific labor rate to provide a specific estimate for the consumer, the present invention enables the consumer to obtain a higher level view, where the labor component is based on average labor prices in the area for a particular brand of vehicle, where the parts are a parameterized set of parts to reflect different part sources, and where a consumer can get an estimate without a mechanic sitting there picking and choosing all of the individualized components. The present invention allows the user to calculate an estimate without any selection on his or her part of the actual core components of the estimate (labor and parts). The user simply enters the appropriate vehicle and service information.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of determining services pricing, the method comprising:
    a server receiving vehicle identification information from a user via a network connection, wherein the vehicle identification information indicates a vehicle type comprising a vehicle brand;
    the server receiving service type information from the user via the network connection, wherein the service type information indicates a service type and has been selected by the user;
    the server determining an estimate price range based on the vehicle identification information and the service type information, wherein the estimate price range comprises a minimum value and maximum value for the indicated vehicle type and service type, and wherein determining the estimate price range comprises determining a labor estimate and a parts estimate, wherein determining the labor estimate comprises using an econometric model to forecast a base labor rate for a location received from the user and applying a ratio to the base labor rate, wherein the ratio is determined based on information received from the user, wherein the labor estimate comprises a range of labor rates that is determined for both of a dealer shop and an independent shop, and the range of labor rates is further determined from the vehicle brand; and
    the server providing the estimate price range comprising both the range of labor rates for the dealer shop and the independent shop to the user via the network connection, wherein the minimum value and the maximum value are provided to the user as bounds of the estimate price range.

2. The method of claim 1, wherein the labor estimate comprises a range having a minimum and maximum value provided to the user as bounds of the labor estimate range.

3. The method of claim 1, wherein the parts estimate comprises a range having a minimum and maximum value provided to the user as bounds of the parts estimate range.

4. The method of claim 1, wherein the labor estimate and the parts estimate each comprise a range having a minimum value and a maximum value provided to the user as bounds of their respective ranges.

5. The method of claim 1, further comprising the step of the server receiving location information from the user, wherein the server uses the location information to determine the estimate range.

6. The method of claim 5, wherein the location information comprises a zip code.

7. The method of claim 1, wherein using the econometric model comprises employing an ordinary least squares estimator.

8. The method of claim 1, wherein the ratio is determined based on location information received from the user.

9. The method of claim 1, wherein the vehicle identification information comprises make, model, and year for a vehicle.

10. The method of claim 1, wherein the server prompts the user to provide variant information in response to receiving particular predetermined vehicle identification information or service type information.

11. The method of claim 10, wherein the variant information comprises mileage or engine type.

12. The method of claim 10, wherein the server uses the variant information to determine the estimate range.

13. The method of claim 1, further comprising the server sending digital reminders to the user with specific services recommended by a vehicle manufacturer.

14. The method of claim 1, further comprising the server providing a repair-or-replace calculator.

15. A non-transitory program storage device readable by a machine, tangibly embodying a program of instructions executable by the machine to perform a method of determining services pricing for use in a system over a network, the network connected to a server, thereby allowing communication between the server and a user on a client device, the method comprising the steps of:
    the server receiving vehicle identification information from the user, wherein the vehicle identification information indicates a vehicle type comprising a vehicle brand;
    the server receiving service type information from the user, wherein the service type information indicates a service type and has been selected by the user;
    the server determining an estimate price range based on the vehicle identification information and the service type information, wherein the estimate price range comprises a minimum value and maximum value for the indicated vehicle type and service type, and wherein determining the estimate price range comprises determining a labor estimate and a parts estimate, wherein determining the labor estimate comprises using an econometric model to forecast a base labor rate for a location received from the user and applying a ratio to the base labor rate, wherein the ratio is determined based on information received from the user, wherein the labor estimate comprises a range of labor prices that is determined for each of a dealer shop and an independent shop, and the range of labor prices is further determined from the vehicle brand; and the server providing the estimate price range comprising the range of labor prices for each of a dealer shop and an independent shop to the user, wherein the minimum value and the maximum value are provided to the user as bounds of the estimate price range.

16. The device of claim 15, wherein the labor estimate comprises a range having a minimum and maximum value provided to the user as bounds of the labor estimate range.

17. The device of claim 15, wherein the parts estimate comprises a range having a minimum and maximum value provided to the user as bounds of the parts estimate range.

18. The device of claim 15, wherein the labor estimate and the parts estimate each comprise a range having a minimum value and a maximum value provided to the user as bounds of their respective ranges.

19. The device of claim 15, wherein the method further comprises the step of the server receiving location information from the user, wherein the server uses the location information to determine the estimate range.

20. The device of claim 19, wherein the location information comprises a zip code.

21. The device of claim 15, wherein using the econometric model comprises employing an ordinary least squares estimator.

22. The device of claim 15, wherein the ratio is determined based on location information received from the user.

23. The device of claim 15, wherein the vehicle identification information comprises make, model, and year for a vehicle.

24. The device of claim 15, wherein the method further comprises the server prompting the user to provide variant information in response to receiving particular predetermined vehicle identification information or service type information.

25. The device of claim 24, wherein the variant information comprises mileage or engine type.

26. The device of claim 24, wherein the server uses the variant information to determine the estimate range.

27. The device of claim 15, wherein the method further comprises the server sending digital reminders to the user with specific services recommended by a vehicle manufacturer.

28. The device of claim 15, wherein the method further comprises the server providing a repair-or-replace calculator.

29. A method of managing a services pricing determination system, wherein the method comprises:
   a server providing an administrator with an administrative interface via a network connection to the administrator's client device, wherein the administrative interface allows the administrator to save rules for labor information and part information at varying levels of specificity;
   the server receiving vehicle identification information from a user via a network connection, wherein the vehicle identification information indicates a vehicle type comprising a vehicle brand;
   the server receiving service type information from the user via the network connection, wherein the service type information indicates a service type and has been selected by the user;
   the server determining an estimate price range based on the vehicle identification information and the service type information, wherein the estimate price range comprises a minimum value and maximum value for the indicated vehicle type and service type, wherein determining the estimate price range comprises determining a labor estimate and a parts estimate, wherein determining the labor estimate comprises using an econometric model to forecast a base labor rate for a location received from the user and applying a ratio to the base labor rate, wherein the ratio is determined based on information received from the user, wherein the labor estimate comprises a range of rates that is determined for each of a dealer shop and an independent shop, and the range of rates is further determined from the vehicle brand, and wherein determining the labor estimate comprises applying the saved rules for labor information and determining the part estimate comprises applying the saved rules for part information; and
   the server providing the estimate price range comprising the labor range of rates for each of the dealer shop and the independent shop to the user via the network connection, wherein the minimum value and the maximum value are provided to the user as bounds of the estimate price range.

30. The method of claim 29, wherein one level of specificity is across every vehicle for a particular make regardless of model and year, and another level of specificity is for a vehicle of a particular make, model, and year.

31. The method of claim 29, wherein the level of specificity can vary between any permutation of make, model, and year.

32. The method of claim 29, wherein the labor estimate and the parts estimate each comprise a range having a minimum value and a maximum value provided to the user as bounds of their respective ranges.

33. The method of claim 29, wherein using the econometric model comprises employing an ordinary least squares estimator.

34. The method of claim 29, wherein the server prompts the user to provide variant information in response to receiving particular predetermined vehicle identification information or service type information according to one or more of the saved rules.

35. The method of claim 34, wherein the server uses the variant information to determine the estimate range.

36. The method of claim 29, further comprising the server sending digital reminders to the user with specific services recommended by a vehicle manufacturer.

37. The method of claim 29, further comprising the server providing a repair-or-replace calculator.

38. A non-transitory program storage device readable by a machine, tangibly embodying a program of instructions executable by the machine to perform a method of determining services pricing for use in a system over a network, the network connected to a server, the method comprising the steps of:
   the server providing an administrator with an administrative interface via a network connection to the administrator's client device, wherein the administrative interface allows the administrator to save rules for labor information and part information at varying levels of specificity;
   the server receiving vehicle identification information from a user via a network connection, wherein the vehicle identification information indicates a vehicle type comprising a vehicle brand;
   the server receiving service type information from the user via the network connection, wherein the service type information indicates a service type and has been selected by the user;
   the server determining an estimate price range based on the vehicle identification information and the service type information, wherein the estimate price range comprises a minimum value and maximum value for the indicated vehicle type and service type, wherein determining the estimate price range comprises determining a labor estimate and a parts estimate, wherein determining the labor estimate comprises using an econometric model to forecast a base labor rate for a location received from the user and applying a ratio to the base labor rate, wherein the ratio is determined based on information received from the user, wherein the labor estimate comprises a range of rates that is determined for each of a dealer shop and an independent shop, and the labor rate range is further determined from the vehicle brand, and wherein determining the labor estimate comprises applying the saved rules for labor information and determining the part estimate comprises applying the saved rules for part information; and the server providing the estimate price range comprising both the range of rates for the dealer shop and the independent shop to the user via the network connection, wherein the minimum value and the maximum value are provided to the user as bounds of the estimate price range.

39. The device of claim 38, wherein one level of specificity is across every vehicle for a particular make regardless of model and year, and another level of specificity is for a vehicle of a particular make, model, and year.

40. The device of claim 38, wherein the level of specificity can vary between any permutation of make, model, and year.

41. The device of claim 38, wherein the labor estimate and the parts estimate each comprise a range having a minimum value and a maximum value provided to the user as bounds of their respective ranges.

42. The device of claim 38, wherein using the econometric model comprises employing an ordinary least squares estimator.

43. The device of claim 38, wherein the server prompts the user to provide variant information in response to receiving particular predetermined vehicle identification information or service type information according to one or more of the saved rules.

44. The device of claim 43, wherein the server uses the variant information to determine the estimate range.

45. The device of claim 38, wherein the method further comprises the server sending digital reminders to the user with specific services recommended by a vehicle manufacturer.

46. The device of claim 38, wherein the method further comprises the server providing a repair-or-replace calculator.

* * * * *